United States Patent Office 3,819,802
Patented June 25, 1974

3,819,802
PROCESS FOR TREATING WASTE SULFITE LIQUOR
Murray Clinton Robinson, Don Mills, Ontario, Canada, assignor to Spring Chemicals Limited
No Drawing. Continuation of abandoned application Ser. No. 798,616, Feb. 12, 1969. This application Nov. 1, 1971, Ser. No. 194,478
Claims priority, application Canada, Feb. 12, 1968, 12,199
Int. Cl. D21c 11/00
U.S. Cl. 423—158
10 Claims

ABSTRACT OF THE DISCLOSURE

The amount of calcium contained in waste sulfite liquor is reduced by precipitating the calcium as calcium sulfite and separating the precipitate from the remaining waste sulfite liquor solution. The precipitation is caused by dissolving a sulfite-ion-forming compound such as sulfur dioxide and a basic material such as ammonium hydroxide in the waste sulfite liquor. The sulfite-ion-forming compound is dissolved in the waste sulfite liquor in an amount greater than that needed to provide therein a substantially equimolar ratio of $SO_2$ to CaO. The amount of basic material dissolved is such that subsequent to the dissolution of the sulfite-ion-forming compound and the basic material the pH of the waste sulfite liquor is at least 5.0. In addition, the basic material must be one which is capable of being dissolved in the waste sulfite liquor by the sulfite-ion-forming compound and must have a cation selected from the class consisting of magnesium, ammonium and sodium.

RELATED CASES

The present application is a continuation-in-part of copending application, Ser. No. 798,616, filed Feb. 12, 1969 and titled "Process for Treating Waste Sulfite Liquor" which is now abandoned.

This invention relates to a process for treating waste sulfite liquor. More particularly, the present invention relates to a process for precipitating calcium from waste sulfite liquor as calcium sulfite.

BACKGROUND OF THE INVENTION

Sulfite pulping processes are a group of commonly used processes for obtaining pulp from wood or other cellulosic materials. In the sulfite processes, the cellulosic materials are normally treated with an aqueous solution containing an alkali metal bisulfite, alkaline earth metal bisulfite, or ammonium bisulfite. In some instances, when less sulfur dioxide is present in the aqueous solutions all or portions of the metal or the ammonium cations may be present in monosulfite form. In still other instances, excess sulfur dioxide may be present in the solutions, over and above the amount necessary to maintain the cations in the bisulfite form, thus giving rise to what is sometimes referred to as an acid sulfite solution. All of these solutions are usually collectively or generically referred to as sulfite cooking liquors.

The sulfite cooking liquors generally dissolve much of the lignin, some of the hemi-cellulose, as well as other components of the cellulosic material employed, leaving the majority of the cellulose fibers undissolved. The undissolved constituents, mainly cellulose fibers are separated from the solution and the remaining solution containing the dissolved components is known as waste sulfite liquor. The waste sulfite liquor has dissolved therein lignosulfonates and other organic and inorganic compounds of the cation used in the cooking liquor, and of any other cations that may have been present in the sulfite cooking liquor or the cellulosic material.

Some of the most commonly used sulfite cooking liquors contain calcium, magnesium, ammonium or sodium as the principal cation, and accordingly, the resulting waste sulfite liquors are known respectively as calcium-base waste sulfite liquor, magnesium-base waste sulfite liquor, ammonia-base waste sulfite liquor and sodium-base waste sulfite liquor. Mixtures of these cations are also sometimes present in the cooking liquor thereby resulting in mixed base waste sulfite liquors such as calcium-magnesium-base waste sulfite liquor, calcium-ammonia-base waste sulfite liquor and the like.

The waste sulfite liquor solutions contain valuable chemicals such as organic and inorganic salts of the cation used in the sulfite cooking liquor, sulfur in various forms, and a number of organic constituents. As a result, efforts have been made to develop methods for recovering these valuable components, and particularly for recovering sulfur dioxide and the cooking liquor cation for use in the preparation of fresh sulfite cooking liquor and for recovering heating values from the organics.

Unfortunately, because of the amounts of calcium compounds present in these waste sulfite liquors, it is usually economically undesirable to attempt to recover the valuable components of the waste liquor without first reducing the calcium content, and desirably removing essentially all of the calcium from the liquors. More specifically, the amounts of calcium compounds present in the waste sulfite liquors cause scaling problems to occur in various processing equipment such as evaporators, absorbers, recovery boilers and the like, which equipment is or would be used in most processes for recovering the aforesaid valuable components. However, because the calcium removal techniques available heretofore have for the most part been equally economically unattractive, some recovery schemes have been employed without first removing the calcium.

The calcium present in the waste sulfite liquor comes from the wood used in the pulping process, from the water used to make the sulfite cooking solution, and from the various chemicals used in the cooking process. The calcium compounds tend to build up if an ash is recovered and is recycled to the pulping process, thereby increasing the scaling problems in the recovery operation equipment and the risk of such problems in the pulping process equipment as well.

Cunningham, in U.S. Pat. 2,644,748 issued July 7, 1953, discloses a method for removing calcium from a calcium-magnesium-base waste sulfite liquor before evaporation. According to Cunningham's process, a magnesium containing basic material such as dolomite is added to the waste sulfite liquor solution to neutralize the solution and precipitate a portion of the calcium ion present as calcium sulfite. The precipitate is removed and calcined ("burned") dolomite is next added to the solution remaining in such amount that the moles of magnesium ions present exceed the total calcium ions and to adjust the pH to a value in the range of 9.0 to 9.3. Carbon dioxide is then added to convert the calcium remaining in the solution to calcium carbonate which precipitates at the above pH. The solution remaining containing magnesium salts is evaporated and burned to recover sulfur dioxide and magnesium oxide. According to Cunningham's process, only part of the calcium ion present in the waste sulfite liquor precipitates as calcium sulfite on the addition of the dolomite, and it is necessary to carry out the further step of reaction with carbon dioxide in order to remove the remaining amount of calcium.

Russell et al., in U.S. Pat. 2,727,028 issued Dec. 13, 1955 disclose still another process for attempting to remove calcium and then recover and reuse values from waste sulfite liquors. According to Russell et al. "if the proportions of sulfur dioxide and lime [CaO] in the liquor, to be treated, are not substantially stoichiometric, sulfur dioxide is first added to provide a weight ratio of sulfur dioxide to lime [CaO] of substantially 1.14." A basic material such as an hydroxide of ammonia, magnesium or sodium is then added to the waste sulfite liquor in an amount sufficient to neutralize the liquor to a pH not less than 6.5, which according to Russell et al. causes precipitation of the calcium as calcium sulfite.

It has now been found that the prior art processes for removing calcium from waste sulfite liquor can be further improved, particularly processes such as described by Russell et al. wherein a sulfite-ion-forming compound such as sulfur dioxide and a basic material such as ammonium hydroxide are added to the waste sulfite liquor in order to precipitate the calcium as calcium sulfite.

Reduction of the calcium content by the method of the present invention permits the resulting waste sulfite liquor solution to be more effectively and economically processed by evaporation, burning and the like in order to recover the valuable components.

OBJECTS AND SUMMMARY OF THE INVENTION

The primary object of the present invention is to provide a process for reducing the amount of calcium contained in waste sulfite liquor.

A further object is to provide a process for reducing the calcium content of waste sulfite liquor which is more effective than those processes used heretofore.

An additional object is to provide a process for reducing the calcium content of waste sulfite liquor, whereby calcium sulfite is precipitated without any substantial precipitation of other cations used in the pulping process or the calcium removal treatment.

Other objects of the present invention will be apparent to those skilled in the art from the following more detailed description.

According to the present invention, a sulfite-ion-forming compound and a basic material are dissolved in a waste sulfite liquor containing calcium to precipitate calcium as calcium sulfite. The precipitate is then separated from the remaining or resulting waste sulfite liquor solution. The sulfite-ion-forming compound such as sulfur dioxide is dissolved in the waste sulfite liquor in an amount such that subsequent to the dissolution of the sulfite-ion-forming compound there is present in the waste sulfite liquor an amount of sulfur dioxide greater than that needed to provide therein a substantially stoichiometric, that is, equimolar ratio of $SO_2$ to CaO. The basic material is dissolved in the waste sulfite liquor such that subsequent to the dissolution of the sulfite-ion-forming compound and the basic material the pH of the liquor is at least 5.0. The basic material must be one which is capable of being dissolved in the waste sulfite liquor by the addition of the sulfite-ion-forming compound. In addition, the basic material must have a cation selected from the class consisting of magnesium, ammonium and sodium.

Usually, the sulfite-ion-forming compound and the basic material are dissolved in the waste sulfite liquor so as to obtain a $SO_2$ to CaO weight ratio of at least 1.5, and obtain more than about 7000 p.p.m. of dissolved magnesium equivalents (hereinafter defined) prior to the completion of the calcium sulfite precipitation.

The essence of the present invention can best be illustrated when comparing the process of the present invention with processes such as that disclosed in the aforementioned Russell et al. patent. As previously mentioned, Russell et al. disclose that when the $SO_2$ content of the waste sulfite liquor is not sufficient to provide a substantially equimolar ratio of $SO_2$ to CaO (a weight ratio of 1.14), sulfur dioxide is first added to the solution, and then the solution is neutralized with the addition of a basic material.

Surprisingly, it has been found that when even greater amounts of basic material and sulfite-ion-forming compound than that disclosed by Russell et al. are dissolved in the waste sulfite liquor, an even greater reduction in the calcium content can be effected.

Regardless of the initial or original weight ratio of $SO_2$ to CaO in the waste sulfite liquor obtained from the pulping process, sulfite-ion-forming compound is always added to the liquor in the process of the present invention. For example, even if the initial weight ratio is 5 to 1, more sulfite-ion-forming compound is added.

The exact amount of "additional" sulfite-ion-forming compound and "additional" basic material to be dissolved in the waste sulfite liquor to effect the additional precipitation of calcium sulfite (as compared to the Russell et al. process) will vary, depending primarily on the specific waste sulfite liquor, sulfite-ion-forming compound, basic material and reaction conditions employed, as hereinafter more fully discussed.

In short, the present invention involves the discovery that additional calcium sulfite can be precipitated, as compared to processes such as Russell et al., when additional sulfite-ion-forming compound and basic material are dissolved in the waste sulfite liquor so as to provide therein additional magnesium, ammonium or sodium sulfite, including bisulfite forms as hereinafter discussed.

DETAILED DESCRIPTION OF THE PREFERRED EMBODIMENTS

The present invention is applicable to treating any calcium containing waste sulfite liquor which is obtained from a pulping process. As previously mentioned, typical waste sulfite liquors include calcium-base, magnesium-base, ammonia-base, sodium-base and mixtures thereof such as calcium-magnesium-base. It is also to be understood that the original sulfite cooking liquor used in the pulping process can be of any specific type, ranging from neutral to the acid sulfite form depending on the amount of sulfur dioxide dissolved therein. The pH of the waste sulfite liquors obtained from the pulping processes will accordingly be between about 1.5 and 7.0.

Magnesium-, sodium- and ammonia-base waste sulfite liquors normally contain less than about 1000 p.p.m. of calcium, for example, about 200 to 750 p.p.m. Calcium-base waste liquors frequently contain in excess of about 3,500 p.p.m. of calcium. The exact amount of calcium varies with the source of the waste sulfite liquor, that is, with the type of cellulosic material treated and the water and the chemicals used in the pulping process. For example, a magnesium-base waste sulfite liquor normally contains between about 2,000 and 6,500 p.p.m. of magnesium, between about 200 and 600 p.p.m. of calcium and below about 100 p.p.m. of other cations such as strontium, barium, iron, aluminum, sodium, potassium and the like. An ammonia-base waste sulfite liquor would normally contain between about 4,000 and 8,000 p.p.m. of ammonia, between about 300 and 600 p.p.m. of calcium, up to about 100 p.p.m. magnesium and below about 100 p.p.m. of other cations such as strontium, barium, iron, aluminum, sodium potassium and the like. A sodium-base waste sulfite liquor would normally contain between about 8,000 and 13,000 p.p.m. of sodium, between about 200 and 600 p.p.m. of calcium, up to about 100 p.p.m. magnesium and below about 100 p.p.m. of other cations.

The calcium in the waste sulfite liquor is normally dissolved in the liquor in the form of various organic and inorganic salts such as lignosulfonates, oxalates, acetates and sulfates as well as in the form of calcium bisulfite.

By the use of the process of the present invention the calcium content of waste sulfite liquor can be reduced. If desired, the calcium level can be reduced to below about 100 p.p.m., and often to about 50 p.p.m. or lower (based on the weight of the waste sulfite liquor solution). When the calcium level is below about 100 p.p.m., the waste sulfite liquor can be more effectively and economically processed to recover cooking liquor cation component and other valuable materials employing such techniques as evaporators, recovery boilers, absorbers and the like. This is because scaling, if any, which occurs at such low calcium levels, is not economically prohibitive. An additional advantage in obtaining low calcium levels is that any scaling which occurs in various pulping process equipment will be minimized, if not eliminated, for example, when a cation such as magnesium is recovered for use in making fresh cooking liquor.

As previously mentioned, the present invention requires that a basic material be dissolved in the waste sulfite liquor. The basic material may be any compound, mineral or material which is "capable of being dissolved in the waste sulfite liquor by a sulfite-ion-forming compound," that is, which is itself soluble in or becomes soluble, with the addition of sulfite ions, in the waste sulfite liquor, and provides magnesium, ammonium or sodium ions (cations) therein. The basic material used should not cause adverse side reactions, interfere with the precipitation of calcium sulfite and its recovery, or add any deleterious substance to the waste sulfite liquor.

Suitable basic materials which contain magnesium, ammonium or sodium cations and which may be used in the present invention include oxides, hydroxides, carbonates and sulfites of magnesium, ammonium and sodium. The following are illustrative of the specific basic materials which may be used: anhydrous ammonia, ammonium sulfite, aqueous ammonia, ammonium carbonate, ammonium magnesium carbonate, ammonium hydroxide, sodium sulfite, sodium bisulfite, sodium carbonate, sodium hydroxide, sodium oxide, magnesium hydroxide, magnesium oxide, magnesium carbonate and magnesium sulfite. In addition, minerals or ores containing magnesium compounds may also be used, such as dolomite $$(CaCO_3MgCO_3),$$

brucite $(MgO \cdot H_2O)$, and magnesite $(MgCO_3)$. These magnesium containing minerals when found in nature normally have extraneous material associated with them which may be removed to form concentrates, and it is to be understood that these expressions include concentrates of the minerals as well as the minerals themselves. Calcined products of the magnesium containing minerals and concentrates thereof are also to be included within the scope of the term "magnesium containing minerals."

Mixtures of the above compounds and minerals may be employed, for example, magnesium sulfite and magnesium hydroxide, magnesium sulfite and dolomite, or ammonium hydroxide and magnesium hydroxide and the like.

Preferably, the basic material which is used is the same as the predominant cation of the waste sulfite liquor, excluding calcium. For example, with ammonia-base waste sulfite liquors, ammonium hydroxide or anhydrous ammonia is employed, with sodium-base waste sulfite liquors, sodium hydroxide is employed and with magnesium-base waste sulfite liquors, magnesium hydroxide is employed. With calcium-base waste sulfite liquors, magnesium or ammonium hydroxide is preferably employed.

The amount of basic material dissolved in the waste sulfite liquor is, in its broadest aspect, the amount which is sufficient to raise or to maintain the pH of the waste sulfite liquor at a value of at least 5.0 subsequent to the dissolution of the sulfite-ion-forming compound. In other words, even when the waste sulfite liquor obtained from the pulping process has a pH of 5 or above, basic material is dissolved with sulfite-ion-forming compound to maintain the pH at 5 or above. The exact amount depends largely on the exact amount of sulfite-ion-forming compound which is dissolved in the liquor. In the process of the present invention, however, the amount of basic material dissolved will be, in all instances, in excess of the amount required simply to raise the pH from its "original" value, that is, the pH value of the waste sulfite liquor solution as it is obtained from the pulping process, to a pH of 7.0. The amount dissolved is even greater than that dissolved in the aforementioned Russell et al. process (Pat. 2,727,028) wherein sulfur dioxide is added, if necessary, to obtain a substantially equimolar ratio of $SO_2$ to CaO and the liquor then neutralized, for example to a pH of 7.0. This of course is because in the process of the present invention even more sulfur dioxide is dissolved in the waste sulfite liquor than in the Russell et al. process, as further discussed hereinafter.

Normally in the process of the present invention the basic material is dissolved in the waste sulfite liquor solution in an amount such that more than about 7,000 p.p.m. (based on the weight of the solution) of magnesium equivalents are dissolved therein prior to the completion of precipitation of the calcium sulfite. In the case of magnesium-, sodium- and ammonia-base waste liquors usually more than about 10,000 p.p.m. of magnesium equivalents are dissolved in the liquor prior to the completion of calcium sulfite precipitation.

The term "magnesium equivalents" as used herein means the p.p.m. of dissolved magnesium plus magnesium equivalents of dissolved ammonia, sodium and potassium, if potassium is dissolved in the waste sulfite liquor in excess of about 50 p.p.m. In other words, the p.p.m. of ammonia, sodium and potassium which are dissolved in the waste sulfite liquor are converted to p.p.m. magnesium i.e. magnesium equivalents, and added to any p.p.m. of dissolved magnesium that are present in order to obtain the "magnesium equivalent" figure. The p.p.m. of dissolved ammonia are converted to the magnesium equivalent by multiplying the p.p.m. of dissolved ammonia by factor of 0.715. The p.p.m. of dissolved sodium are multiplied by a factor of 0.529 and the p.p.m. of dissolved potassium by a factor of 0.311 to convert to p.p.m. of dissolved magnesium equivalents.

It is important to note that the p.p.m. of dissolved magnesium equivalents, i.e., p.p.m. of dissolved magnesium, ammonia, sodium and potassium, is not simply the amounts added during the calcium removal treatment of the present invention, but also includes amounts that may have been present in the original waste sulfite liquor obtained from the pulping process. By analyzing the original waste sulfite liquor it is a simple matter to determine how much basic material must be dissolved to reach the desired amount of magnesium equivalents prior to the completion of calcium sulfite precipitation.

If desired, some of the magnesium, ammonium or sodium cation requirements may be added by dissolving basic material in the waste sulfite liquor as the calcium sulfite is precipitating, provided the total desired amount of dissolved magnesium equivalents is present prior to completion of the precipitation. The magnesium equivalent figures may be determined, for example, by analyzing a sample of the solution taken during precipitation or more preferably by analyzing a sample taken after the precipitation has been completed. Obviously, if a significant amount of the magnesium equivalents that were once dissolved precipitate with the calcium sulfite, then the solution analysis should take place during or even before precipitation, for example, by analyzing feed streams to the precipitation zone.

The following Table I lists the amounts of dissolved magnesium equivalents that should be obtained before completion of calcium sulfite precipitation for various waste sulfite liquors and various basic materials.

TABLE I

| Waste sulfite liquor | Basic material | Preferred amounts of magnesium equivalents (p.p.m.) | More preferred amounts of magnesium equivalents (p.p.m.) |
|---|---|---|---|
| Magnesium-base | Magnesium hydroxide | >10,000 | 12,000–15,000 |
| Do | Ammonium hydroxide | >10,000 | 10,000–15,000 |
| Calcium-base | Magnesium hydroxide | >7,000 | 7,000–10,000 |
| Ammonia-base | do | >11,000 | 12,000–17,000 |
| Do | Ammonium hydroxide | >12,000 | 13,000–17,000 |
| Do | Sodium hydroxide | >11,000 | 11,000–16,000 |
| Sodium-base | do | >12,000 | 12,000–16,000 |

A sulfite-ion-forming compound is also added to and dissolved in the waste sulfite liquor solution in accordance with the present invention. The term "sulfite-ion-forming-compound" as used herein means any compound capable of dissolving in the waste sulfite liquor solution to yield a sulfite ion. Such sulfite-ion-forming compounds include sulfur dioxide, magnesium sulfite, ammonium sulfite, calcium sulfite and sodium sulfite. Preferably, sulfur dioxide is used.

The sulfite-ion-forming compound is added such that subsequent to dissolution of the sulfite-ion-forming compound there is present in the waste, sulfite liquor an amount of sulfur dioxide greater and preferably substantially greater than that needed to provide a substantially equimolar ratio of $SO_2$ to CaO. The equimolar ratio of $SO_2$ to CaO is equal to a weight ratio of 1.14.

Unlike the aforesaid Russell et al. process wherein additional sulfur dioxide is only dissolved in the waste sulfite liquor solution if necessary to obtain a substantially equimolar ratio of $SO_2$ to CaO, the present invention involves alway dissolving sulfite-ion-forming compound such as sulfur dioxide. Even when the initial or original weight ratio of $SO_2$ to CaO, that is, the ratio in the waste sulfite liquor as obtained from the pulping process, is in excess of 1.14, for example, 5 to 1, still more sulfur dioxide is dissolved in the waste sulfite liquor in accordance with the present invention by the addition of the sulfite-ion-forming compound.

Normally, sufficient sulfite-ion-forming compound is added to the waste sulfite liquor so as to obtain a $SO_2$ to CaO weight ratio of at least 1.5 to 1, and more preferably at least 2 to 1. The higher weight ratios are particularly preferred in connection with magnesium- and sodium-base waste liquors where frequently the initial $SO_2$ to CaO weight ratio is in excess of 2 to 1. As with the basic material, the desired amount of sulfite-ion-forming compound is dissolved in the waste liquor prior to completion of calcium sulfite precipitation.

The $SO_2$ value as used herein is determined by analyzing the waste sulfite liquor as obtained from the pulping process according to TAPPI Standard Method T629 os–53. This method yields what is referred as to "free sulfur dioxide," which is the $SO_2$ value to be used in determining the $SO_2$ to CaO weight ratio.

In order to determine whether the sulfite-ion-forming compound added during the calcium removal treatment is sufficient to provide the desired $SO_2$ to CaO ratio, the amount of sulfite-ion-forming compound to be added, is added to a sample of the original waste liquor without adding any basic material and the resulting liquor is then analyzed according to the above TAPPI method. The amount of "free sulfur dioxide" obtained from this analysis is then used as the $SO_2$ value to determine the weight ratio.

If any calcium is to be added during the calcium removal treatment such as by the addition of dolomite, this amount should be included with the original amount of calcium in the liquor to determine the CaO value. The calcium content in the liquor can be determined by atomic absorption spectrophotometry using the "method of additions." The calcium is then calculated as being all CaO for purposes of determining the $SO_2$ to CaO value.

The sulfite-ion-forming compound and basic material are added and dissolved in the above amounts so that at the completion of their dissolution the pH of the waste sulfite liquor solution is at least 5, preferably between 5 and 7.5, and more preferably between about 5.5 and 6.5. Under these conditions calcium contained in the waste sulfite liquor precipitates as calcium sulfite. If it is desired to precipitate calcium sulfite without any substantial amount of precipitation of magnesium salts that may be present therein, particularly when working with a magnesium-base liquor, the pH should preferably not exceed about 6.0. Substantial precipitation of magnesium salts would normally be considered to exist when the resulting percipitate contains above about 3 percent by weight of magnesium based on the total weight of the washed precipitate.

The calcium sulfite precipitate is separated from the remaining waste sulfite liquor solution by any conventional technique such as filtration, settling and the like.

The basic material and the sulfite-ion-forming compound may be added and dissolved in the waste sulfite liquor in any convenient manner known to those skilled in the art and in any order desired. One preferred sequence, however, is to maintain the pH of the waste sulfite liquor below about 4 (such as by the addition of sulfur dioxide) until a major portion of the basic material to be added is dissolved, and then add the remaining basic material to be dissolved along with more sulfur dioxide, if needed, to reach the desired final pH. Of course, when the same compound is used as the basic material and sulfite-ion-forming compound it may be added and dissolved in any convenient manner desired.

The addition of the above substances to the waste sulfite liquor as well as the precipitation and separation of calcium sulfite precipitate from the remaining solution is conveniently conducted at atmospheric pressure and at a temperature of above about 50° C., such as between 60 and 100° C., and preferably between about 70 and 95° C. If desired, higher pressures and temperatures can be used provided adverse reactions are avoided.

Once the added basic material and added sulfite-ion-forming compound are dissolved in the waste sulfite liquor solution and the final desired pH is obtained, up to about 30 minutes or more of residence time is usually sufficient to obtain completion of calcium sulfite precipitation. Normally, the precipitation is completed in about 5 to 10 minutes.

After the calcium sulfite precipitate is removed from the remaining waste sulfite liquor solution it may be treated to obtain calcium compounds and sulfur dioxide. The solution remaining, i.e., filtrate, can be treated to obtain compounds of the principal cations present as well as other valuable components. This may be accomplished, for example, by concentrating the remaining solution by evaporation, and burning the concentrate autogeneously to produce sulfur dioxide and an oxide of the cation. Because of the reduced calcium level in the waste sulfite liquor, scaling problems are minimized and desirably eliminated. Other recovery processes known to those skilled in the art may also be employed. The recovered cation compounds may be used to prepare new sulfite cooking liquor, the preparation of which forms no part of the present invention.

Examples

The following Table II contains a listing of 90 experiments denoted as Run Nos. 1 to 90 which were conducted to demonstrate the results that can be obtained by the process of the present invention and to compare these results to those obtained by prior art processes.

The ammonia-, calcium-, sodium- and magnesium-base waste sulfite liquors used in these experiments were obtained from various pulp mills and were analyzed to determine their calcium, magnesium, sodium, ammonia and sulfur dioxide contents. Calcium, magnesium and sodium concentrations were determined by atomic absorption spectrophotometry using the "method of additions." Sulphur dioxide was determined by TAPPI "Free Sulfur Dioxide" Standard Method T629 os–53. The ammonia content was determined by the Kjeldahl Method.

Column 3 of Table II gives the calcium content and column 4 the $SO_2$ to CaO weight ratio of the liquors as received from the pulp mills, i.e., the original or initial values. The CaO value was obtained by determining the calcium content and converting it to a corresponding amount of CaO for purposes of determining the ratio.

The ammonia-base waste sulfite liquor used in the Runs 1 to 40, as obtained from the pulp mills, was found to contain about 4,500 p.p.m. of ammonia (equal to 3,220 magnesium equivalents), about 85 p.p.m. magnesium and 350 to about 500 p.p.m. of calcium. The pH of the liquor as received from the pulp mill was about 2.

In Runs 1 to 5 the ammonia-base waste sulfite liquor was first treated by dissolving sulfur dioxide therein so as to raise the $SO_2$ to CaO weight ratio from its initial value of 0.816:1 to 1.874:1. Aqueous ammonia (28% by weight ammonia) was then added to 400 gram portions of the sulfur dioxide treated liquor in the amounts shown. The gram amounts in column 6 are of the aqueous ammonia solution. The resulting liquor was then continuously stirred for 15 minutes at 70° C. at which time precipitation of calcium sulfite was completed. The final pH value (column 7) was determined at this point. No additional sulfur dioxide was added with the ammonia.

At the conclusion of the stirring period, a portion of the stirred liquor was then filtered and the filtrate analyzed for p.p.m. calcium (column 8) and p.p.m. magnesium equivalents (column 9), which was the procedure followed in all 90 runs.

A similar waste sulfite liquor was treated in Runs 6 to 20, but without any initial adjustment of the $SO_2$ to CaO weight ratio. In these runs sulfur dioxide was added with the designated amounts of aqueous ammonia (29% by weight ammonia in Runs 16–20) to obtain final pH values at the conclusion of a twenty minute stirring period as shown in column 7.

In Runs 21 to 26 a similar ammonia-base waste sulphite liquor was first treated to adjust the $SO_2$ to CaO weight ratio by dissolving sulfur dioxide therein, and then a 50% by weight solution of NaOH (in the amounts indicated) was added to 400 gram portions of the $SO_2$ treated liquor, without any additional sulfur dioxide being added, to reach a final pH as shown in column 7 after 15 minutes of stirring.

Runs 27 to 30 did not have any initial $SO_2$ adjustment. Solid NaOH was added with sulfur dioxide to obtain final pH values as shown after 30 minutes of stirring.

Runs 31 to 34 were another series with an ammonia-base liquor where the liquor was first adjusted with sulfur dioxide as above. Powdered magnesium hydroxide was then added, without additional sulfur dioxide, to obtain the final pH values shown after 15 minutes of stirring.

In Runs 35 to 40 there was no initial $SO_2$ adjustment, but sulfur dioxide was added with the magnesium hydroxide to obtain the final pH value shown after 30 minutes of stirring.

In the remaining Runs 41 to 90 a procedure similar to that discussed above was followed. Stirring times of 15 to 20 minutes were used in all cases.

A calcium-base liquor was used in Runs 41 to 54, and was found to contain 4600 to 4800 p.p.m. of calcium, and about 100 p.p.m. of magnesium. The pH of the liquor as received from the pulp mill was 2.8 to 2.9. In Runs 47 to 50 where the original $SO_2$ to CaO weight ratio was adjusted, no additional sulfur dioxide was added with the basic material used. In the Runs 41 to 46 where no adjustment was made, sulfur dioxide was added with the specified amounts of basic material to obtain the final pH values shown. In Runs 51 to 54, Run 51 was adjusted by adding sulfur dioxide and then no additional sulfur dioxide was added with the magnesium hydroxide. Run 52 was a portion of the Run 51 filtrate to which was added more magnesium hydroxide (the total of the amount added in 51 and 52 being 7.975 grams based on the original 400 grams of the waste sulphite liquor used). More sulphur dioxide was added with the magnesium hydroxide to obtain the final pH value shown after stirring. The same procedure as in 52 was followed in 53 and 54, with a portion of the resulting filtrate from the preceding run being used in the following run.

A sodium-base waste sulfite liquor was used in Runs 55–71, and was found to contain 245 to 280 p.p.m. of calcium, 11,250 p.p.m. of sodium (equal to 5,950 p.p.m. of magnesium equivalents), and about 40 p.p.m. of magnesium. The pH of the liquor as received from the pulp mill was 4.6. In Runs 55 to 66 there was no sulfur dioxide added either to adjust the $SO_2$ to CaO weight ratio or with the 50% solution of sodium hydroxide to reach the final pH after stirring.

In Runs 67 to 71 sulfur dioxide was only added with the aqueous solution of sodium hydroxide to reach the final pH values after stirring.

A magnesium-base waste sulfite liquor was used in Runs 72–90, and was found to contain 293 to 350 p.p.m. of calcium and 4,600 to 5,900 p.p.m. of magnesium. The pH of the liquor as received from the pulp mill was 3.8 to 4.0. In Runs 72–74 and 85–90 no sulfur dioxide was added at any time during the run. In Runs 75–84, sulfur dioxide was added with the basic material to obtain the final pH after stirring.

In all of the runs where sulfur dioxide was only added with the basic material sufficient sulfur dioxide was present in the waste sulfite liquor solution such that the $SO_2$ to CaO weight ratio would be in excess of 1.14:1 and normally in excess of 1.5:1.

TABLE II

| 1 | 2 | 3 | 4 | 5 | 6 | | 7 | 8 | 9 |
|---|---|---|---|---|---|---|---|---|---|
| Run | WSL | Ca (p.p.m.) in WSL obtained from pulping process | $SO_2$/CaO in WSL obtained from pulping process | $SO_2$/CaO after adjustment | Basic material added | (grams) | Final pH of WSL | Ca (p.p.m.) in filtrate | Mg equivalents (p.p.m.) in filtrate |
| 1 | $NH_3$ | 420 | 0.816 | 1.874 | 28% $NH_3$ | (9.63) | 6.2 | 450 | 8,143 |
| 2 | $NH_3$ | 420 | 0.816 | 1.874 | 28% $NH_3$ | (10.18) | 6.72 | 460 | 8,408 |
| 3 | $NH_3$ | 420 | 0.816 | 1.874 | 28% $NH_3$ | (12.1) | 7.30 | 470 | 9,681 |
| 4 | $NH_3$ | 420 | 0.816 | 1.874 | 28% $NH_3$ | (18.8) | 7.82 | 470 | 12,729 |
| 5 | $NH_3$ | 420 | 0.816 | 1.874 | 28% $NH_3$ | (63.8) | 8.30 | 420 | 35,216 |
| 6 | $NH_3$ | 510 | 0.816 | | 28% $NH_3$ | (11.09) | 5.7 | 520 | 8,760 |
| 7 | $NH_3$ | 540 | 0.816 | | 28% $NH_3$ | (15.21) | 5.8 | 540 | 10,830 |
| 8 | $NH_3$ | 530 | 0.816 | | 28% $NH_3$ | (19.3) | 5.7 | 260 | 12,870 |
| 9 | $NH_3$ | 488 | 0.816 | | 28% $NH_3$ | (23.43) | 5.8 | 57 | 14,930 |
| 10 | $NH_3$ | 488 | 0.816 | | 28% $NH_3$ | (27.54) | 5.6 | 51 | 16,970 |
| 11 | $NH_3$ | 520 | 0.816 | | 28% $NH_3$ | (31.6) | 5.8 | 60 | 19,020 |
| 12 | $NH_3$ | 495 | 0.816 | | 28% $NH_3$ | (35.7) | 5.6 | 44 | 21,070 |
| 13 | $NH_3$ | 495 | 0.816 | | 28% $NH_3$ | (39.85) | 5.8 | 39 | 23,130 |
| 14 | $NH_3$ | 470 | 0.816 | | 28% $NH_3$ | (43.95) | 5.75 | 52 | 25,170 |
| 15 | $NH_3$ | 495 | 0.816 | | 28% $NH_3$ | (56.3) | 5.76 | 50 | 31,320 |
| 16 | $NH_3$ | 435 | 1.58 | | 29% $NH_3$ | (8.8919) | 6.5 | 420 | 7,840 |
| 17 | $NH_3$ | 435 | 1.58 | | 29% $NH_3$ | (10.823) | 6.2 | 410 | 8,840 |
| 18 | $NH_3$ | 435 | 1.58 | | 29% $NH_3$ | (12.75) | 6.3 | 410 | 9,840 |
| 19 | $NH_3$ | 435 | 1.58 | | 29% $NH_3$ | (14.685) | 6.4 | 410 | 10,840 |
| 20 | $NH_3$ | 435 | 1.58 | | 29% $NH_3$ | (16.616) | 6.3 | 160 | 11,840 |
| 21 | $NH_3$ | 420 | 0.816 | 1.608 | 50% NaOH | (11.5) | 6.25 | 500 | 7,560 |
| 22 | $NH_3$ | 420 | 0.816 | 1.608 | 50% NaOH | (13.3) | 6.75 | 480 | 8,250 |
| 23 | $NH_3$ | 420 | 0.816 | 1.608 | 50% NaOH | (14.84) | 7.3 | 490 | 8,840 |
| 24 | $NH_3$ | 420 | 0.816 | 1.608 | 50% NaOH | (17.1) | 7.9 | 490 | 9,680 |
| 25 | $NH_3$ | 420 | 0.816 | 1.608 | 50% NaOH | (21.8) | 8.95 | 470 | 11,480 |
| 26 | $NH_3$ | 420 | 0.816 | 1.608 | 50% NaOH | (25.8) | 9.65 | 470 | 12,970 |

TABLE II—Continued

| 1 Run | 2 WSL | 3 Ca (p.p.m.) in WSL obtained from pulping process | 4 SO₂/CaO in WSL obtained from pulping process | 5 SO₂/CaO after adjustment | 6 Basic material added (grams) | | 7 Final pH of WSL | 8 Ca (p.p.m.) in filtrate | 9 Mg equivalents (p.p.m.) in filtrate |
|---|---|---|---|---|---|---|---|---|---|
| 27 | NH₃ | 420 | 0.816 | | NaOH | (7.20) | 5.7 | 430 | 8,932 |
| 28 | NH₃ | 420 | 0.816 | | NaOH | (9.23) | 5.58 | 179 | 10,462 |
| 29 | NH₃ | 420 | 0.816 | | NaOH | (11.81) | 5.73 | 53 | 12,392 |
| 30 | NH₃ | 420 | 0.816 | | NaOH | (15.88) | 5.7 | 38 | 15,432 |
| 31 | NH₃ | 420 | 0.816 | 1.205 | Mg(OH)₂ | (4.5) | 6.32 | 410 | 7,220 |
| 32 | NH₃ | 420 | 0.816 | 1.205 | Mg(OH)₂ | (5.1) | 6.98 | 420 | 7,820 |
| 33 | NH₃ | 420 | 0.816 | 1.205 | Mg(OH)₂ | (8.4) | 7.5 | 470 | 9,320 |
| 34 | NH₃ | 420 | 0.816 | 1.205 | Mg(OH)₂ | (42.3) | 7.74 | 333 | 7,420 |
| 35 | NH₃ | 350 | 0.816 | | Mg(OH)₂ | (5.8) | 5.61 | 415 | 9,470 |
| 36 | NH₃ | 350 | 0.816 | | Mg(OH)₂ | (7.25) | 5.68 | 310 | 11,170 |
| 37 | NH₃ | 350 | 0.816 | | Mg(OH)₂ | (8.73) | 5.70 | 129 | 13,020 |
| 38 | NH₃ | 350 | 0.816 | | Mg(OH)₂ | (10.2) | 5.70 | 92 | 14,020 |
| 39 | NH₃ | 350 | 0.816 | | Mg(OH)₂ | (11.69) | 5.73 | 84 | 15,220 |
| 40 | NH₃ | 350 | 0.816 | | Mg(OH)₂ | (13.16) | 5.70 | 95 | 17,220 |
| 41 | Ca | 3,750 | 0.0915 | | Mg(OH)₂ | (2.350) | 6.0 | 3,800 | 2,070 |
| 42 | Ca | 3,750 | 0.0915 | | Mg(OH)₂ | (4.245) | 6.0 | 1,660 | 3,950 |
| 43 | Ca | 3,750 | 0.0915 | | Mg(OH)₂ | (6.101) | 6.0 | 196 | 7,000 |
| 44 | Ca | 3,750 | 0.0915 | | Mg(OH)₂ | (7.921) | 5.9 | 77 | 8,770 |
| 45 | Ca | 3,750 | 0.0915 | | Mg(OH)₂ | (9.701) | 6.0 | 49 | 10,200 |
| 46 | Ca | 3,750 | 0.0915 | | Mg(OH)₂ | (11.442) | 6.0 | 41 | 12,700 |
| 47 | Ca | 4,800 | 0.0715 | 1.14 | Mg(OH)₂ | (6.0) | 6.3 | 230 | 4,800 |
| 48 | Ca | 4,800 | 0.0715 | 1.14 | Mg(OH)₂ | (6.3) | 7.0 | 165 | 5,100 |
| 49 | Ca | 4,800 | 0.0715 | 1.14 | Mg(OH)₂ | (6.8) | 7.65 | 150 | 5,600 |
| 50 | Ca | 4,800 | 0.0715 | 1.14 | Mg(OH)₂ | (32.6) | 7.9 | 150 | 5,700 |
| 51 | Ca | 4,600 | 0.0348 | 1,048 | Mg(OH)₂ | (7.050) | 7.7 | 435 | 6,250 |
| 52 | Ca | 4,600 | 0.0348 | | Mg(OH)₂ | (7.975) | 5.76 | 82 | 7,000 |
| 53 | Ca | 4,600 | 0.0348 | | Mg(OH)₂ | (8.864) | 5.82 | 74 | 8,000 |
| 54 | Ca | 4,600 | 0.0348 | | Mg(OH)₂ | (9.720) | 5.73 | 60 | 8,900 |
| 55 [1] | Na | 245 | 9.2 | | 50% NaOH | (2.24) | 6.38 | 265 | 6,800 |
| 56 [1] | Na | 245 | 9.2 | | 50% NaOH | (3.08) | 6.72 | 260 | 7,120 |
| 57 [1] | Na | 245 | 9.2 | | 50% NaOH | (4.48) | 7.30 | 240 | 7,650 |
| 58 [1] | Na | 245 | 9.2 | | 50% NaOH | (5.32) | 7.82 | 123 | 7,960 |
| 59 [1] | Na | 245 | 9.2 | | 50% NaOH | (7.00) | 8.80 | 130 | 8,600 |
| 60 [1] | Na | 245 | 9.2 | | 50% NaOH | (9.25) | 9.76 | 175 | 9,450 |
| 61 [1] | Na | 280 | 9.0 | | 50% NaOH | (1.3950) | 6.38 | 285 | 6,870 |
| 62 [1] | Na | 280 | 9.2 | | 50% NaOH | (3.4775) | 7.22 | 245 | 8,270 |
| 63 [1] | Na | 280 | 9.2 | | 50% NaOH | (3.9358) | 7.38 | 250 | 8,580 |
| 64 [1] | Na | 280 | 9.2 | | 50% NaOH | (4.7375) | 7.83 | 155 | 9,157 |
| 65 [1] | Na | 280 | 9.2 | | 50% NaOH | (6.4719) | 8.81 | 155 | 10,407 |
| 66 [1] | Na | 280 | 9.2 | | 50% NaOH | (8.7585) | 9.70 | 175 | 12,097 |
| 67 [2] | Na | 250 | 9.0 | | 50% NaOH | (4.14) | 5.69 | 226 | 8,765 |
| 68 [2] | Na | 250 | 9.0 | | 50% NaOH | (6.74) | 5.69 | 224 | 10,490 |
| 69 [2] | Na | 250 | 9.0 | | 50% NaOH | (9.24) | 5.66 | 220 | 12,140 |
| 70 [2] | Na | 250 | 9.0 | | 50% NaOH | (12.02) | 5.65 | 194 | 13,980 |
| 71 [2] | Na | 250 | 9.0 | | 50% NaOH | (19.88) | 5.67 | 90 | 18,590 |
| 72 [3] | Mg | 293 | 3.45 | | Mg(OH)₂ | (1.8) | 6.75 | 340 | 7,800 |
| 73 [3] | Mg | 293 | 3.45 | | Mg(OH)₂ | (2.5) | 7.08 | 335 | 8,000 |
| 74 [3] | Mg | 293 | 3.45 | | Mg(OH)₂ | (26.6) | 7.32 | 352 | 8,100 |
| 75 [4] | Mg | 300 | 3.45 | | Mg(OH)₂ | (2.54) | 5.65 | 380 | 9,400 |
| 76 [4] | Mg | 300 | 3.45 | | Mg(OH)₂ | (3.51) | 5.68 | 305 | 10,500 |
| 77 [4] | Mg | 300 | 3.45 | | Mg(OH)₂ | (4.495) | 5.68 | 245 | 11,300 |
| 78 [4] | Mg | 300 | 3.45 | | Mg(OH)₂ | (6.05) | 5.71 | 129 | 12,100 |
| 79 [4] | Mg | 300 | 3.45 | | Mg(OH)₂ | (8.97) | 5.68 | 98 | 15,000 |
| 80 [4] | Mg | 300 | 3.45 | | 28% NH₃ | (11.6) | 5.63 | 125 | 10,420 |
| 81 [4] | Mg | 300 | 3.45 | | 28% NH₃ | (15.76) | 5.61 | 93 | 11,730 |
| 82 [4] | Mg | 300 | 3.45 | | 28% NH₃ | (20.0) | 5.61 | 81 | 13,920 |
| 83 [4] | Mg | 300 | 3.45 | | 28% NH₃ | (24.25) | 5.72 | 62 | 15,860 |
| 84 [4] | Mg | 300 | 3.45 | | 28% NH₃ | (36.9) | 5.73 | 46 | 21,250 |
| 85 [5] | Mg | 350 | 2.61 | | 23% NH₃ | (2.96) | 6.20 | 260 | 6,913 |
| 86 [5] | Mg | 350 | 2.61 | | 23% NH₃ | (3.64) | 6.60 | 250 | 7,095 |
| 87 [5] | Mg | 350 | 2.61 | | 23% NH₃ | (4.82) | 7.20 | 255 | 7,480 |
| 88 [5] | Mg | 350 | 2.61 | | 23% NH₃ | (6.87) | 7.70 | 255 | 8,320 |
| 89 [5] | Mg | 350 | 2.61 | | 23% NH₃ | (27.6) | 8.60 | 250 | 16,740 |
| 90 [5] | Mg | 350 | 2.61 | | 23% NH₃ | (81.1) | 9.00 | 230 | 34,850 |

[1] No sulphur dioxide added in Runs 55 to 66.
[2] Sulphur dioxide added with NaOH in Runs 67 to 71.
[3] No sulphur dioxide added to Runs 72 to 74.
[4] Sulphur dioxide added with basic material, Runs 75 to 84.
[5] No sulphur dioxide added, Runs 85 to 90.

The above runs clearly illustrate the improvement of the process of the present invention as compared to the prior art processes. Compare, for example, Runs 1–5 with 6–20; Runs 21–26 with 27–30; Runs 31–34 with 35–40; Runs 67–71 (with the basic material) in accordance with to CaO ratio was adjusted, while in the second series a sulfur dioxide was only added with the basic material, but in amounts such that the SO₂ to CaO weight ratio would be greater than 1.14:1.

In Runs 55–66, the original SO₂ to CaO ratio exceeded 1.14:1 and yet when more sulfur dioxide was added in Runs 67–71 (with the basic material) in accordance with the present invention a further reduction in calcium sulfite was obtained. Similar results were obtained when comparing Runs 72–74 with 75–79; and Runs 85–90 and with 80–84, the latter series in each case being the ones where additional sulfur dioxide was added.

Runs 16–20 also significantly illustrate the advantage of adding more sulfur dioxide and basic material in accordance with the present invention even though the original SO₂ to CaO weight ratio exceeded the 1.14:1 value by a substantial amount. In short, it has been shown by the present invention that more calcium sulfite can be precipitated when more sulfite-ion-forming compound and basic material are added than that taught by the prior art processes, the exact additional amounts necessary to effect the additional precipitation varying with each particular system, but being obtainable in all systems.

It is to be understood that where reference is made in the present specification and claims to a cation sulfite being added to the waste sulfite liquor, the cation bisulfite form is also to be included where applicable, for example instead of adding solid magnesium sulfite, the sulfite can first be dissolved in water, with or without the addition of sulfur dioxide, and the resulting solution added to the waste sulfite liquor. Such a solution may contain both sulfite and bisulfite forms of the magnesium. Similarly where the specified cations exist as solid bisulfites such as sodium bisulfite these are to be included. In other words, when reference is made to the sulfite it is to include bisulfite forms as well.

The principles, preferred embodiments and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art without departing from the spirit of the present invention.

I claim:

1. In the process for treating waste sulfite liquor containing calcium in order to reduce the amount of calcium contained therein by precipitating calcium from the waste sulfite liquor as calcium sulfite and separating the precipitated calcium sulfite from the remaining waste sulfite liquor solution, wherein a sulfite-ion-forming compound and a basic material are dissolved in the waste sulfite liquor, the improvement of further reducing the amount of calcium contained in said waste sulfite liquor, which comprises:
    (a) dissolving a sulfite-ion-forming compound in said waste sulfite liquor in an amount such that the $SO_2$ to CaO weight ratio is at least 2 to 1;
    (b) dissolving a basic material in said waste sulfite liquor such that subsequent to the dissolution of the sulfite-ion-forming compound and the basic material the waste sulfite liquor is at a pH of at least 5.0, said basic material being capable of being dissolved in said waste sulfite liquor by said sulfite-ion-forming compound and having a cation selected from the class consisting of magnesium, ammonium and sodium.

2. The process of claim 1 wherein the waste sulfite liquor is selected from the class consisting of calcium-based, magnesium-base, sodium-base, ammonia-base and mixtures thereof.

3. The process of claim 2 wherein the sulfite-ion-forming compound is selected from the class consisting of sulfur dioxide, magnesium sulfite, ammonium sulfite, calcium sulfite and sodium sulfite.

4. The process of claim 3 wherein the basic material is selected from the class consisting of magnesium containing minerals and hydroxides, oxides, carbonates and sulfites of magnesium, ammonium and sodium.

5. The process of claim 4 wherein the sulfite-ion-forming compound is sulfur dioxide and the basic material and sulfur dioxide are dissolved in said waste sulfite liquor so that the pH is between about 5.0 and 7.5.

6. In the process for treating waste sulfite liquor containing calcium in order to reduce the amount of calcium contained therein by precipitating calcium from the waste sulfite liquor as calcium sulfite and separating the precipitated calcium sulfite from the remaining waste sulfite liquor solution, wherein a sulfite-ion-forming compound and a basic material are dissolved in the waste sulfite liquor, the improvement of further reducing the amount of calcium contained in said waste sulfite liquor, which comprises:
    (a) dissolving a sulfite-ion-forming compound in said waste sulfite liquor in an amount such that the $SO_2$ to CaO weight ratio is at least 2 to 1 prior to the completion of precipitation of calcium sulfite;
    (b) dissolving a basic material in said waste sulfite liquor such that subsequent to the dissolution of the sulfite-ion-forming compound and the basic material and prior to the completion of precipitation of calcium sulfite the waste sulfite liquor is at a pH of at least 5.0, said basic material being selected from the class consisting of magnesium containing minerals, and hydroxides, oxides, carbonates and sulfites of magnesium, ammonium and sodium.

7. The process of claim 1 wherein the waste sulfite liquor is selected from the class consisting of calcium-base, magnesium-base, sodium-base, ammonia-base and mixtures thereof.

8. The process of claim 7 wherein the sulfite-ion-forming compound is sulfur dioxide.

9. The process of claim 6 wherein more than about 7000 p.p.m. of magnesium equivalents are dissolved in said waste sulfite liquor prior to the completion of precipitation of calcium sulfite.

10. The process of claim 9 wherein subsequent to the dissolution of the basic material and the sulfite-ion-forming compound the pH of the waste sulfite liquor is between about 5 to 7.5.

References Cited
UNITED STATES PATENTS

| | | | |
|---|---|---|---|
| 2,727,028 | 12/1955 | Russell et al. | 423—158 |
| 2,644,748 | 7/1953 | Cunningham | 423—165 |
| 2,238,456 | 4/1951 | Tomlinson | 423—158 |

EDWARD J. MEROS, Primary Examiner

U.S. Cl. X.R.

162—29; 423—169, 512